(12) United States Patent
Kley (10) Patent No.: US 6,947,977 B1
(45) Date of Patent: Sep. 20, 2005

(54) SCALABLE TRANSACTION SYSTEM FOR A NETWORK ENVIRONMENT

(75) Inventor: Victor B. Kley, Berkeley, CA (US)

(73) Assignee: Metadigm LLC, Berkeley, CA (US)

( * ) Notice: Subject to any disclaimer, the term of this patent is extended or adjusted under 35 U.S.C. 154(b) by 863 days.

(21) Appl. No.: 09/877,727

(22) Filed: Jun. 8, 2001

Related U.S. Application Data

(60) Provisional application No. 60/210,855, filed on Jun. 9, 2000.

(51) Int. Cl.[7] .............................................. G06F 15/16
(52) U.S. Cl. ...................................... 709/219; 709/203
(58) Field of Search ................................ 709/226, 203, 709/219, 241; 713/201

(56) References Cited

U.S. PATENT DOCUMENTS

| | | | | |
|---|---|---|---|---|
| 6,070,191 A | * | 5/2000 | Narendran et al. | 709/226 |
| 6,115,752 A | * | 9/2000 | Chauhan | 709/241 |
| 6,128,279 A | * | 10/2000 | O'Neil et al. | 370/229 |
| 6,167,438 A | * | 12/2000 | Yates et al. | 709/216 |
| 6,173,407 B1 | * | 1/2001 | Yoon et al. | 713/201 |
| 6,212,565 B1 | * | 4/2001 | Gupta | 709/229 |
| 6,330,605 B1 | * | 12/2001 | Christensen et al. | 709/226 |
| 6,377,991 B1 | * | 4/2002 | Smith et al. | 709/226 |
| 6,389,448 B1 | * | 5/2002 | Primak et al. | 718/105 |
| 6,490,615 B1 | * | 12/2002 | Dias et al. | 709/219 |
| 6,490,625 B1 | * | 12/2002 | Islam et al. | 709/229 |
| 6,513,061 B1 | * | 1/2003 | Ebata et al. | 709/203 |
| 6,542,468 B1 | * | 4/2003 | Hatakeyama | 370/238 |
| 6,701,415 B1 | * | 3/2004 | Hendren, III | 711/138 |
| 6,728,884 B1 | * | 4/2004 | Lim | 713/201 |
| 6,775,692 B1 | * | 8/2004 | Albert et al. | 709/207 |
| 6,779,039 B1 | * | 8/2004 | Bommareddy et al. | 709/238 |
| 6,792,461 B1 | * | 9/2004 | Hericourt | 709/225 |
| 2001/0023442 A1 | * | 9/2001 | Masters | 709/227 |

* cited by examiner

Primary Examiner—Bradley Edelman
(74) Attorney, Agent, or Firm—Townsend and Townsend and Crew LLP (57) ABSTRACT

Techniques for performing services in a secure and scalable manner in a network environment. Code modules and data used for performing a service and that contain proprietary, confidential, or trade secret information, are stored and executed by service provider systems that are not exposed to user systems used to configure the service requests. The techniques are scalable as the number of service provider systems performing the services can be scaled, either up or down, in proportion to the demand for the services.

21 Claims, 5 Drawing Sheets

SCALABLE TRANSACTION SYSTEM FOR A NETWORK ENVIRONMENT

CROSS-REFERENCES TO RELATED APPLICATIONS

The present application claims priority from U.S. Provisional Patent Application No. 60/210,855, entitled "SCALABLE NET BASED TRANSACTION SYSTEM" filed Jun. 9, 2000, the entire disclosure of which is herein incorporated by reference for all purposes.

BACKGROUND OF THE INVENTION

The present invention relates to the use of communication networks such as the Internet for providing online services. In particular, the present invention provides techniques for performing services in a network environment in a secure and scalable manner.

With the widespread use of computers, an expanding telecommunication network, and the rising popularity of communication networks such as the Internet, an increasing number of transactions and services are performed online using computer systems coupled to the communication network. Computer systems connected to communication networks such as the Internet can generally be classified as "clients" or "servers" depending on the role the computer systems play with respect to requesting information and services or providing information and services. Computer systems that are used by users to request information or to request a service are classified as "client" computers (or "clients"). Computers systems that store information and provide the information in response to a user request received from a client computer, or computer systems that perform processing to provide the user-requested services are called "server" computers (or "servers"). A particular computer system may function both as a client and as a server.

Accordingly, a user may initiate a request to perform a service (referred to as a "service request") using a client computer coupled to a communication network such as the Internet. In the World Wide Web ("Web") environment, a user may initiate a service request by accessing a web page from a web site hosted by a server coupled to the communication network, and configuring a service request via the web page. The web page provides an interface via which a user can select one or more services to be performed and provide the data for performing the services.

A web page is a form of a hypertext document that may incorporate any combination of text, graphics, audio and video content, software programs, and other data. Web pages may also contain hypertext links to other web pages. Each web page is uniquely identified by an address called a Uniform Resource Locator (URL) that enables users to access the web page. Users typically access web pages using a program called a "web browser" which generally executes on a client user computer coupled to the Internet. A browser enables users to access and interact with web pages. Users generally access web pages by providing URL information to the browser, either directly or indirectly, and the browser responds by retrieving the web page corresponding to the user-provided URL and displaying the web page to the user. Examples of browsers include the Internet Explorer browser program provided by Microsoft Corporation, the Netscape Navigator browser provided by Netscape Corporation, and others.

Servers that store web pages and host web sites are generally referred to as "web servers." Web servers are responsible for receiving web page requests from client systems, and for communicating web pages requested by the clients back to the requesting client systems. In conventional network-based transaction systems, web servers are also configured to perform services requested by clients via service requests. Code modules stored and executed by the web servers generally provide the services. Accordingly, in conventional transaction systems, the web servers not only host web sites storing web pages, but also perform processing to complete/perform the user-requested service.

Since the service is performed by the web servers themselves, conventional transaction and service provider systems comprising one or more web servers require substantial computing and storage resources to be able to operate across high speed network connections and to service multiply connected users (clients) in parallel. Further, to ensure satisfactory performance, the systems are typically designed to handle the worst-case user count scenario. As a result, conventional web server-based service provider systems are very expensive and require constant maintenance to reduce downtime, which further adds to the cost of performing a service.

Conventional web server-based service provider systems are also susceptible to attack by vandals or hackers intent on damaging or disrupting the transaction service provided by the servers. For example, hackers may maliciously "crowd" a particular web server (i.e., swamp the web server with service requests) in order to degrade the performance of the web server. Further, since service request processing is done by the web server itself, the code modules that perform processing related to the service requests and the databases used for the processing are stored by the web servers themselves. Since the web servers can be easily accessed by user clients, these code modules and databases are susceptible to vandals and hackers intent on gaining access to confidential or trade secret information contained in the code modules, the databases, etc.

In light of the above, there is a need for techniques which allow services to be provided in a network-based environment in a secure manner. It is also desirable that the techniques be scalable and economical.

BRIEF SUMMARY OF THE INVENTION

The present invention provides techniques for performing services in a secure and scalable manner. According to an embodiment of the present invention code modules and data used for performing a service and that contain proprietary, confidential, or trade secret information, are stored and executed by service provider systems which are not exposed to user systems used to configure the service requests. In this manner, vandals and hackers are prevented from gaining access to confidential or trade secret information contained in the code modules and/or the databases stored by the service provider systems. This enables the services to the performed in a secure manner. The techniques are also scalable as the number of service provider systems performing the services can be scaled, either up or down, in proportion to the demand for the services.

According to an embodiment of the present invention, techniques are provided for performing a service in a network environment comprising a user computer system, a plurality of web server systems, and a plurality of service provider systems. In this embodiment, service request information is configured using the user computer system. The service request information comprises information requesting performance of the service. The user computer system also stores web server systems information identifying the plurality of web server systems coupled to the user computer system and services provided by the plurality of web server systems. Based upon the web server systems information and the service request information, the user computer system identifies a first web server system from the plurality of web server systems to receive the service request information, and communicates the service request information to the first web server system. The first web server system is configured to store service provider systems information identifying the plurality of service provider systems coupled to the first web server system and services performed by the plurality of service provider systems. Based upon the service provider systems information and the service request information, the web server system identifies a first service provider system from the plurality of service provider systems to receive the service request information. The service request information is then communicated from the first web server system to the first service provider system which performs the service requested by the service request information.

According to another embodiment of the present invention, techniques are provided for performing a service in a network environment comprising a user system, a first server system, and a second server system. In this embodiment, the second server system receives a signal indicating performance of a first service by the first server system, the first service performed by the first server system in response to service request information received by the first server system from the user system, the service request information comprising information requesting performance of the first service. The signal received by the second server system also identifies a user of the user system who requested performance of the first service. Responsive to the signal, the second server system performs a second service that includes generating first information for the user of the user system related to performance of the first service. According to an embodiment of the present invention, the first information comprises billing information for performance of the first service by the first server system, the billing information indicating compensation payable by the user of the user system for performance of the first service.

Various additional objects, features and advantages of the present invention can be more fully appreciated with reference to the detailed description and accompanying drawings that follow.

DETAILED DESCRIPTION OF THE INVENTION

Figure 1:
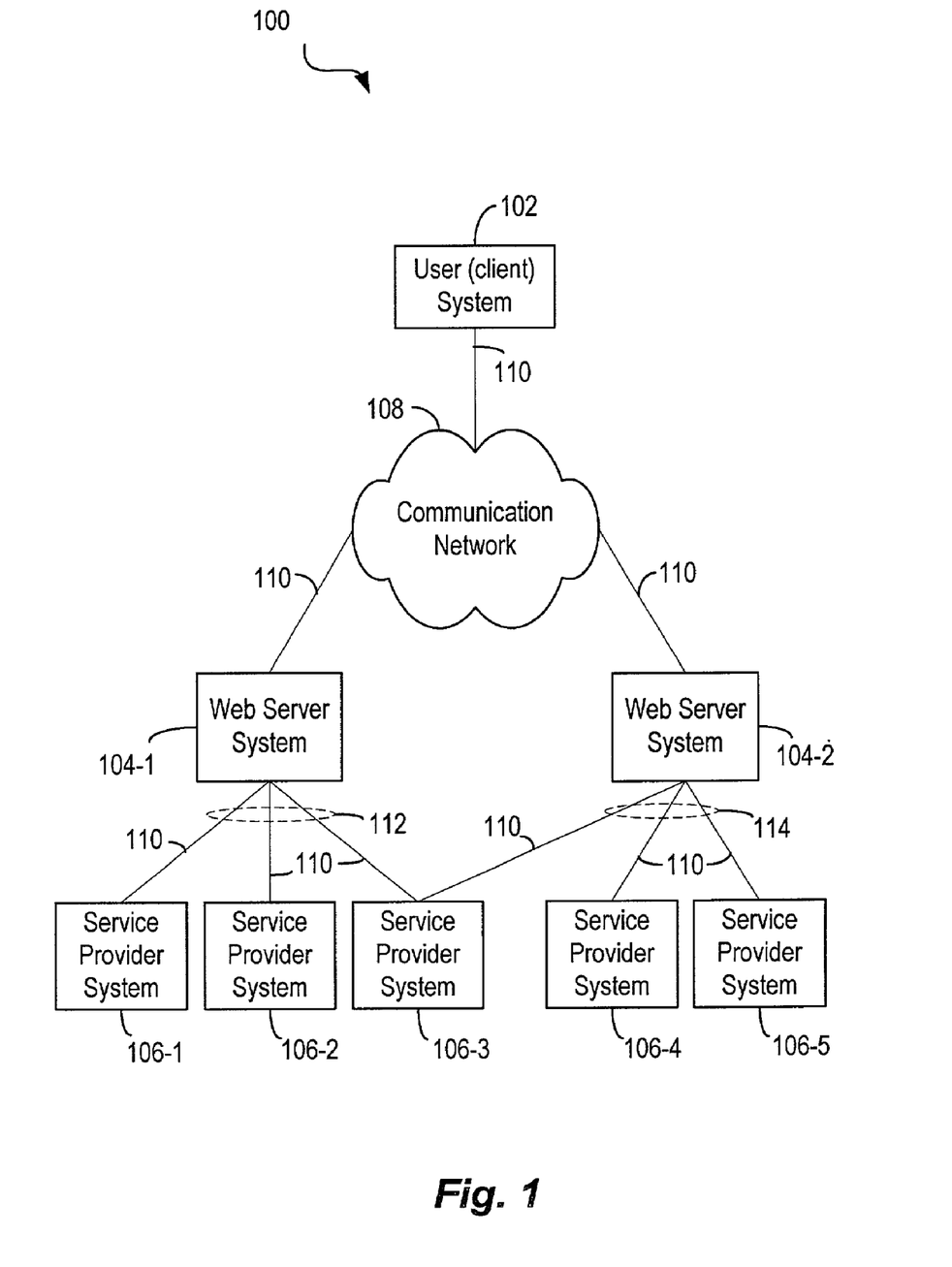
FIG. 1 is a simplified block diagram of a distributed computer network that may incorporate an embodiment of the present invention.

The present invention provides a transaction system for performing services in a secure and scalable manner in a network environment. FIG. 1 is a simplified block diagram of a distributed computer network 100 that may incorporate an embodiment of the present invention. As shown, computer network 100 comprises a number of computer systems, including a user system 102, one or more web server systems (WSSs) 104, and one or more service provider systems (SPSs) 106. The various computer systems are coupled to a communication network 108 and the service provider systems 106 are coupled to web server systems 104 via communication links 110. For example, as depicted in FIG. 1, web server system 104-1 is coupled to service provider systems 106-1, 106-2, and 106-3, while web server system 104-2 is coupled to service provider systems 106-3, 106-4, and 106-5. A particular service provider system 106 may be coupled to one or more web server systems 104. For example, service provider system 106-3 is coupled to web server system 104-1 and 104-2. According to an embodiment of the present invention, the connections (112 and 114) between web server systems 104 and service provider systems 106 are secure connections.

Distributed computer network 100 depicted in FIG. 1 is merely illustrative of an embodiment incorporating the present invention and does not limit the scope of the invention as recited in the claims. One of ordinary skill in the art would recognize other variations, modifications, and alternatives. For example, a plurality of user systems 102 may be coupled to communication network 108.

Communication network 108 provides a mechanism allowing user systems 102 to communicate and exchange information with web server systems 104. Communication network 108 may itself be comprised of many interconnected computer systems and communication links. While in one embodiment, communication network 108 is the Internet, in other embodiments, communication network 108 may be any suitable communication network including a local area network (LAN), a wide area network (WAN), a wireless network, an intranet, a private network, a public network, a switched network, and the like.

Communication links 110 may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, extensible markup language (XML), wireless application protocol (WAP), vendor-specific protocols, customized protocols, and others.

According to an embodiment of the present invention, user system 102 is used to configure and initiate service requests requesting performance of one or more services. As part of configuring a service request, a user may also use user system 102 to provide information, if any, needed for or used by the service requests. For purposes of this invention, the term "service request" is intended to include any information or data requesting performance of a service. Additionally, for purposes of this invention, the term "service request input data" is intended to include any information or data input by the user for the service request and which may be used for performance of the requested service. For purposes of this invention, the term "service request information" is intended to include the service request and the associated service request input data.

Code modules and programs executing on user system 102 may facilitate configuration of the service request information. For example, a browser program executing on user system 102 may be used to configure the service requests and the associated service request input data. Using a browser executing on user system 102, a user of user system 102 may access a web page stored by a web server 104 and configure a service request information, including the service request and the service request input data, via the web page. The browser may then communicate the service request information to the web server storing the web page. In alternative embodiments of the present invention, programs and code modules, other than a browser, executing on user system 102 may also be used to configure service request information.

The service request information may be configured by a user of user system 102, or alternatively, may be automatically configured by code modules executing on user system 102 without requiring user input. The code modules and programs executing on user system 102 may also be configured to automatically determine one or more web server systems 104 to which the service request information is to be communicated. The service request information, including the service request and the associated service request input data (if any), is then communicated from user system 102 to the particular selected web server system(s) 104. Results or any output from performing the requested service is provided back to the user system requesting the service. The service output or results may then be provided to the user of the user system via an output device coupled to user system 102. A user system 102 generally functions as a client requesting services from servers coupled to communication network 108. Further information related to functions performed by a user system 102 is provided below.

According to an embodiment of the present invention, a web server system 104 is configured to host web sites and store web pages that may be used to configure service request information. A particular web server system 104 may be configured to receive web page requests from user systems 102, to determine web pages requested by the client from the web page requests, and to communicate the requested web pages to the requesting user systems.

Web server systems 104 are also configured to receive service request information, including service requests and service request input data, from one or more user systems 102. According to the teachings of the present invention, based upon the service request information, a web server system 104 is configured to determine one or more service provider systems which can perform the requested service, and to communicate the service request information to the one or more service provider systems 106. Communication of information between web server system 104 and service provider system 106 is usually performed over a secure communication channel between web server system 104 and service provider system 106 to prevent unauthorized access to the information. Web server system 104 may receive results of the service processing from service providers 106 and forward the results to the user systems that requested the service. Further information related to functions performed by a service provider system 106 is described below.

According to an embodiment of the present invention, a service provider system 106 is configured to perform the services requested by user systems 102. A service provider system 106 is configured to receive service request information from one or more web server systems 104, and to perform the requested services using the service request input data. One or more service provider systems 106 may perform processing for a single service request received by web server system 104. Likewise, a particular service provider system 104 may handle service requests from multiple web server systems 104. After the requested service has been performed, service provider system 106 is configured to communicate results or output of the service request processing to web server system 104 from which the service request information was received. The web server system may then communicate the results back to the requesting user system 102. Further information related to functions performed by a service provider system 106 is described below.

Figure 2:
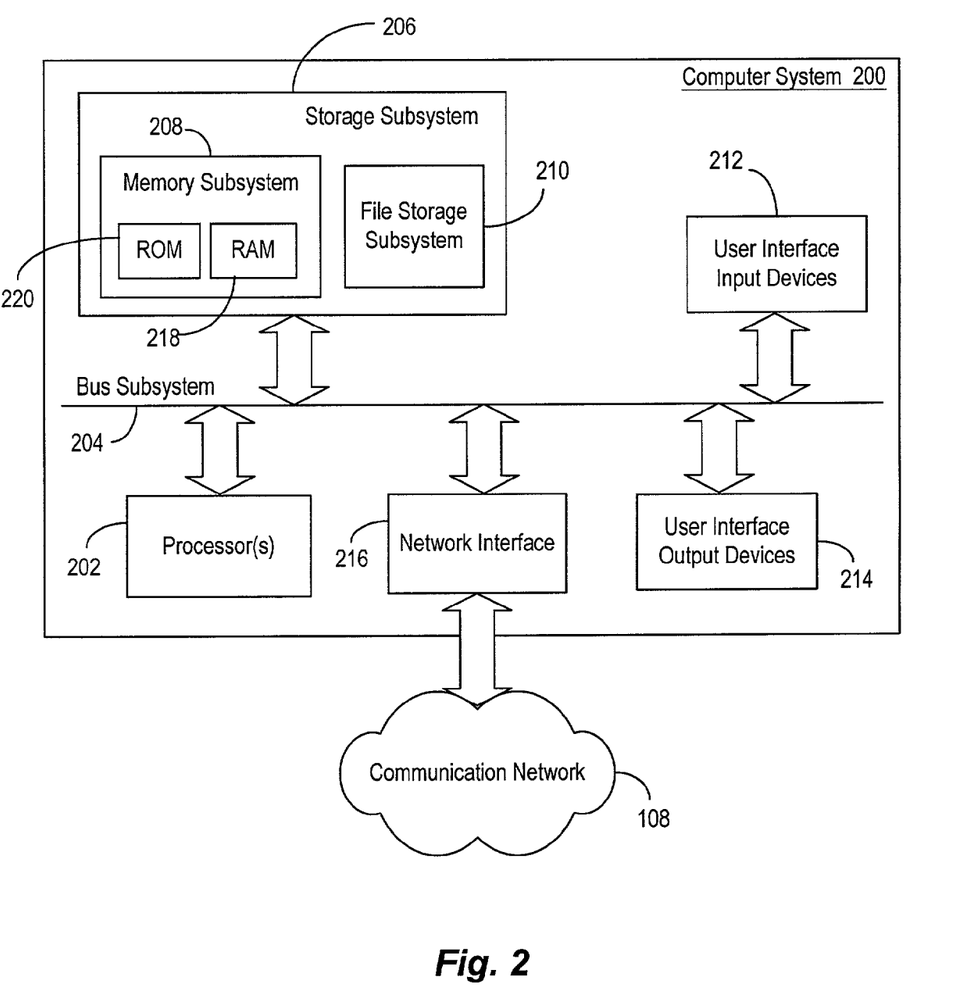
FIG. 2 is a simplified block diagram of a computer system according to an embodiment of the present invention.

FIG. 2 is a simplified block diagram of a computer system 200 according to an embodiment of the present invention. Computer system 200 may be used as user (or client) system 102, a web server system 104, a service provider system 106, or any other computer system coupled to communication network 108. As shown in FIG. 2, computer system 200 includes at least one processor 202, which communicates with a number of peripheral devices via a bus subsystem 204. These peripheral devices may include a storage subsystem 206, comprising a memory subsystem 208 and a file storage subsystem 210, user interface input devices 212, user interface output devices 214, and a network interface subsystem 216. The input and output devices allow user interaction with computer system 200. A user may be a human user, a device, a process, another computer, and the like. Network interface subsystem 216 provides an interface to other computer systems and to communication network 108.

Bus subsystem 204 provides a mechanism for letting the various components and subsystems of computer system 200 communicate with each other as intended. The various subsystems and components of computer system 200 need not be at the same physical location but may be distributed at various locations within network 100. Although bus subsystem 204 is shown schematically as a single bus, alternative embodiments of the bus subsystem may utilize multiple busses.

User interface input devices 212 may include a keyboard, pointing devices such as a Felix or optical tablet with built-in and captured puck, a mouse, trackball, touchpad, a graphics tablet, a scanner, a barcode scanner, a touchscreen incorporated into the display, audio input devices such as voice recognition systems, microphones, and other types of input devices. In general, use of the term "input device" is intended to include all possible types of devices and ways to input information using computer system 200.

User interface output devices 214 may include a display subsystem, a printer, a fax machine, or non-visual displays such as audio output devices. The display subsystem may be a cathode ray tube (CRT), a flat-panel device such as a liquid crystal display (LCD), or a projection device. The display subsystem may also provide non-visual display such as via audio output devices. In general, use of the term "output device" is intended to include all possible types of devices and ways to output information from computer system 200.

Storage subsystem 206 may be configured to store the basic programming and data constructs that provide the functionality of the computer system and of the present invention. For example, according to an embodiment of the present invention, software modules implementing the functionality of the present invention may be stored in storage subsystem 206. These software modules may be executed by processor(s) 202 of computer system 200. In a distributed environment, the software modules may be stored on a plurality of computer systems and executed by processors of the plurality of computer systems. Storage subsystem 206 may also provide a repository for storing various databases that may be used by the present invention. Storage subsystem 206 may comprise memory subsystem 208 and file storage subsystem 210.

Memory subsystem 208 may include a number of memories including a main random access memory (RAM) 218 for storage of instructions and data during program execution and a read only memory (ROM) 220 in which fixed instructions are stored. File storage subsystem 210 provides persistent (non-volatile) storage for program and data files, and may include a hard disk drive, a floppy disk drive along with associated removable media, a Compact Digital Read Only Memory (CD-ROM) drive, an optical drive, removable media cartridges, and other like storage media. One or more of the drives may be located at remote locations on other connected computers.

Computer system 200 itself can be of varying types including a personal computer, a portable computer, a workstation, a computer terminal, a network computer, a mainframe, a kiosk, a personal digital assistant (PDA), a communication device such as a cell phone, or any other data processing system. Due to the ever-changing nature of computers and networks, the description of computer system 200 depicted in FIG. 2 is intended only as a specific example for purposes of illustrating the preferred embodiment of the computer system. Many other configurations of a computer system are possible having more or fewer components than the computer system depicted in FIG. 2. Computer system 200 may function as a client or a server, or combinations thereof.

Figure 3:
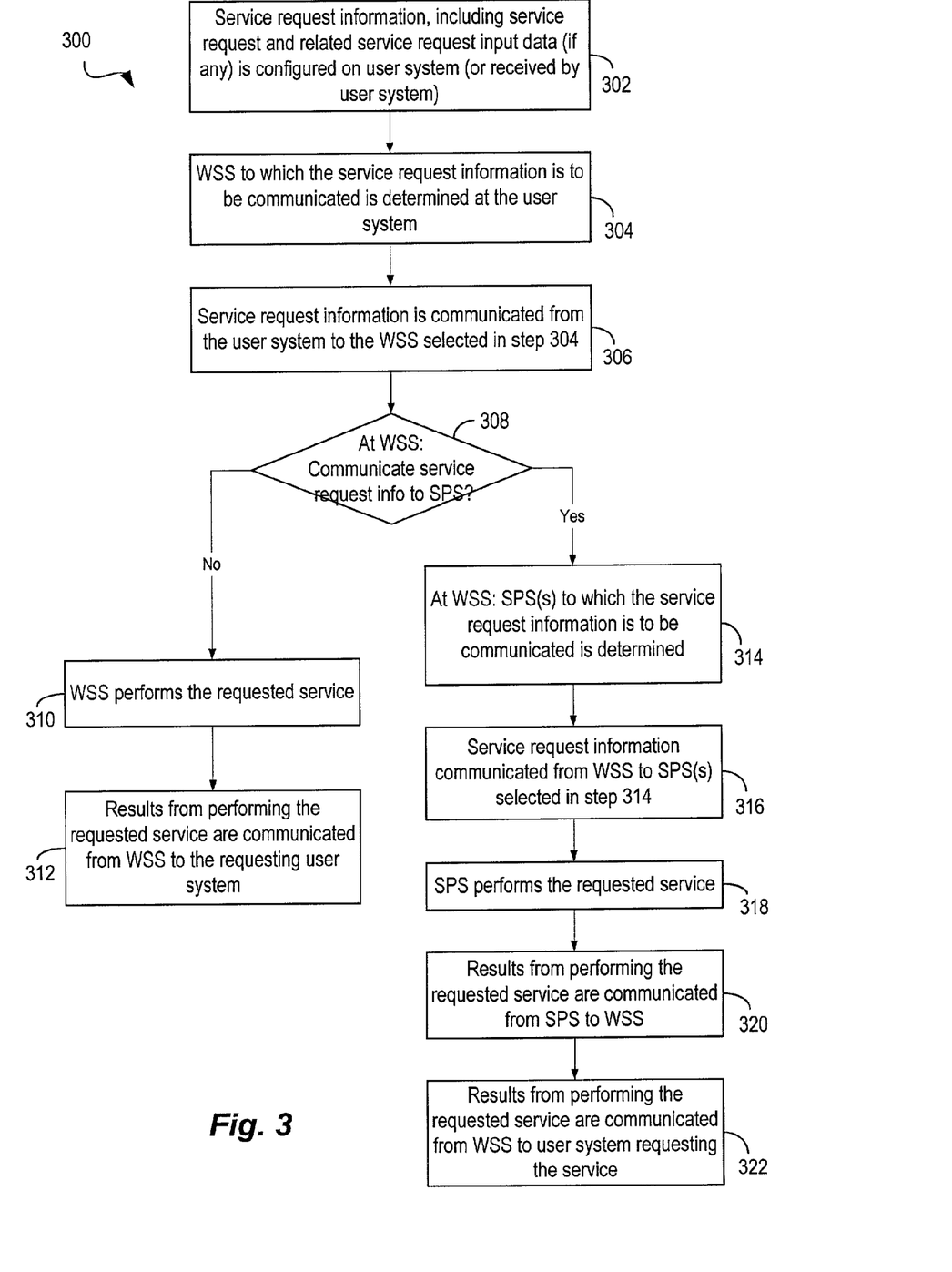
FIG. 3 is a simplified high-level flowchart of a method for processing service requests in a secure and scalable manner according to an embodiment of the present invention.

FIG. 3 is a simplified high-level flowchart 300 of a method for processing service requests in a secure and scalable manner according to an embodiment of the present invention. Flowchart 300 depicted in FIG. 3 is merely illustrative of an embodiment incorporating the present invention and does not limit the scope of the invention as recited in the claims. One of ordinary skill in the art would recognize other variations, modifications, and alternatives.

As depicted in FIG. 3, the method is initiated when service request information is configured at user system 102 (or is received by user system 102) (step 302). As stated above, the service request information may include a service request requesting performance of a service, and service request input data associated with the service request. For example, the service request information may include a service request requesting performance of an online purchase transaction, and the associated service request input data might include the name of the purchaser, credit card information for the purchaser, the item purchased, and the like, which is used to process the purchase transaction. It should be apparent that the service request information may not include service request input data if such data is not required for the requested service.

According to an embodiment of the present invention, the service request information, which includes the service request and the service request input data, is configured by a user of user system 102 using a program executing on user system 102. For example, as described above, the user may configure the service request information using a browser program executing on user system 102. In alternative embodiments of the present invention, the service request information may be configured automatically (i.e., without specific user input) by programs or code modules executing on user system 102. For example, the service request information might be configured by a first program executing on user system 102 in response to a signal received by the first program. The source of the signal may be another program executing on user system 102, a device coupled to user system 102, another computer system coupled to user system 102, and the like.

A web server system 104 to which the service request information, which includes service request and the corresponding service request input data, is to be communicated is determined on user system 102 (step 304). Various techniques may be used to select a web server system 104 to which the service request information is to be communicated. These techniques are typically implemented by modules executing on user system 102. According to a first technique, user system 102 determines if the service request information was configured using a web page accessed by user system 102 from a web server system 104. If the service request information was configured using a web page accessed from a particular web server system 104, then the particular web server system 104 is selected to receive the service request information.

According to another technique, user system 102 may store information ("web server systems information") about a plurality of web server systems and services provided by the plurality of web server systems. In this embodiment, user system 102 may access the web server systems information and select a particular web server system to receive the service request information. In an alternative embodiment, user system 102 may poll one or more web server systems 104 identified in the web server systems information to determine web servers that can handle the requested service and which are available to handle the service request. User system 102 may select the web server system 104 to which the service request information is to be communicated based upon the results of the polling operation. In this manner, if a particular web server system is not online or not available, an alternate web server system can be selected by user system 102 to process the service request.

The service request information, including the service request and the associated service request input data (if any), is then communicated from user system 102 to the web server system 104 determined in step 304 (step 306). The web server system which receives the service request information then determines if the service request identified by the service request information can be processed by the web server system itself, or if the service request information is to be communicated to one or more service provider systems 106 (step 308). If it is determined that the service request information is to be communicated to a service provider system 106, processing then continues with step 314. Else, the service request is processed and the requested service performed on the web server system itself (step 310). The web server system performing the service then communicates the results or outputs of the service performance to the requesting user system 102 (step 312).

According to an embodiment of the present invention, all service requests received by a web server system 104 are forwarded by the web server system to an appropriate service provider system 106 for processing the service request (i.e., the web server system is not configured to perform the service request). According to another embodiment of the present invention, web server system 104 is configured to perform the requested service (or portions of the requested service) if performance of the requested service does not involve the use of proprietary/confidential information or the use of code modules which comprise trade secret information or confidential information. Accordingly, upon receiving service request information, web server system 104 may determine in step 308 if the service request requires the use of information or code modules which contain proprietary or trade secret information. If it is determined that performance of the requested service requires use of information or modules which contain proprietary or trade secret information, then the service request information is communicated to an appropriate service provider system 106 for processing. Else, the requested service is performed by the web server system itself (step 310), and results or output of the processing are communicated from web server system 104 to requesting user system 102 (step 312). In this manner, the present invention ensures that confidential or trade secret information is not stored on web server systems 104 where it can be exposed to users of user systems 102.

Assuming that web server system 104 determines in step 308 that the service request information is to be communicated to a service provider system, web server system 104 then determines one or more service provider systems to which the service request information is to be communicated (step 314). The selection is done by modules executing on web server system 104.

Various techniques may be used to determine the service provider system(s) to which the service request information is to be communicated. According to a first technique, web server system 104 stores information ("service provider systems information") identifying a plurality of service provider systems 106 that are coupled to the web server system and services provided by the service provider systems. In this embodiment, web server system 104 may access the service provider systems information and select a particular service provider system 106 to receive the service request information. In an alternative embodiment, web server system 104 may poll one or more service provider systems 106 identified in the service provider systems information to determine service provider systems that can perform the requested service and which are available to perform the requested service. Web server system 104 may then select a particular service provider system 104 to perform the requested service based upon the results of the polling operation. In this manner, if a particular service provider system is not online or not available, an alternate service provider system can be selected by web server system 104 to perform the requested service.

Web server system 104 may select a particular service provider system that is best suited to perform the requested service. For example, web server system 104 may determine the utilization and workload of the various service provider systems that in principle could perform the requested service, and select a particular service provider system 106 that is the least utilized or that has the lowest workload. In this manner, web server system 104 performs load balancing while distributing the service requests to the various service provider systems 106. This ensures that the service provider systems that can perform the requested service are optimally utilized. This also makes the system very scalable. For example, the number of service provider systems that provide a particular service can be increased/decreased in proportion to the demand for the service. Thus, an increase in demand for the service can be handled by increasing the number of service provider systems configured to perform the service. This is substantially different from conventional transaction systems wherein the computational and memory resources of the web servers performing the service have to be upgraded to handle a larger volume of service requests.

The service request information, which includes the service request and the associated service request input data, is then communicated from the web server system 104 to the one or more service provider systems 106 selected in step 314 (step 316). Generally, a secure communication channel is used to communicate information between web server system 104 and service provider system 106 in order to prevent unauthorized access to the communicated data.

Various different techniques (e.g. interrupt techniques, polling techniques, etc.) may be used to transfer the service request information from web server system 104 to service provider system 106. According to a first technique, web server system 104 sends a message (e.g. an email message) to service provider system 106 that includes the service request information. The information contained in the message may be encrypted for security purposes.

According to another technique, the service request information is stored by web server system 104 in its memory in a certain format (e.g. stored in a file). Web server system 104 then sends a message or an interrupt to the service provider system 106 selected in step 314 instructing the service provider system to read/access the stored information. Upon receiving the message or interrupt from web server system 104, service provider system 106 is configured to access the stored service request information from the memory of web server system 106. Various protocols (e.g. HTTP, FTP, etc.) may be used to transfer the service request information from web server system 104 to service provider system 106.

According to yet another technique, web server system 104 stores the service request information in a specific location (e.g. a particular FTP location, or in a file in a particular directory, etc.) in its memory. In this embodiment, service provider system 106 is configured to periodically check (e.g. using a polling mechanism) the specific memory location on web server system 104 to determine if new service request information is available. If service provider system 106 determines that new service request information has been written to the specific location, then service provider system 106 reads the new service request information from the specific location. As with the other techniques, various protocols (e.g. HTTP, FTP, etc.) may be used to transfer the service request information from web server system 104 to service provider system 106.

A particular service provider system 106 may be configured to access and/or collect information from a plurality of web server systems 104 in order to perform a particular service. Further, a particular service provider system 106 may receive service request information from a plurality of web server systems 104 and the service provider system 106 may perform the requested services. For example, in FIG. 1, service provider system 106-3 may receive service request information from web server system 104-1 and from web server system 104-2.

A service provider system 106 that receives the service request information then performs the service requested by the service request included in the service request information (step 318). Various different kinds of services may be performed by a service provider system 106. Examples of services include performing a commercial transaction (e.g. online purchases, auctions, etc.), banking transactions, application program services, and the like. The service provider system performing the requested service may then communicate results or any outputs from performance of the service to the web server system from which the service request information was received (step 320). The web server system may then communicate the results to the requesting user system 102 where the results may be output to the user (step 322).

As described above, the present invention provides a system for processing service requests, which is both scalable and provides the requested services in a secure and scalable manner. As the demand for a particular service increases, additional service provider systems 106 can be added to handle the workload, and/or the computation capacity of the service provider systems may be increased. In this manner, the transaction system can be easily scaled, either up or down, in proportion to the demand for the service.

Unlike conventional systems, code modules and databases that may contain proprietary, confidential, or trade secret information, are stored and executed by service provider systems 106 which are not exposed to user systems 102. Further, secure connections are established between web server systems 104 and service provider systems 106 to prevent unauthorized access to information communicated between the web server systems and the service provider systems. According to an embodiment of the present invention, service provider systems 106 may also be protected by firewalls. As a result, vandals and hackers are prevented from gaining access to confidential or trade secret information contained in the code modules and/or the databases stored by service provider systems 106. This enables processing related to the services to be performed in a secure manner.

DESCRIPTION OF SPECIFIC EMBODIMENTS

Figure 4:
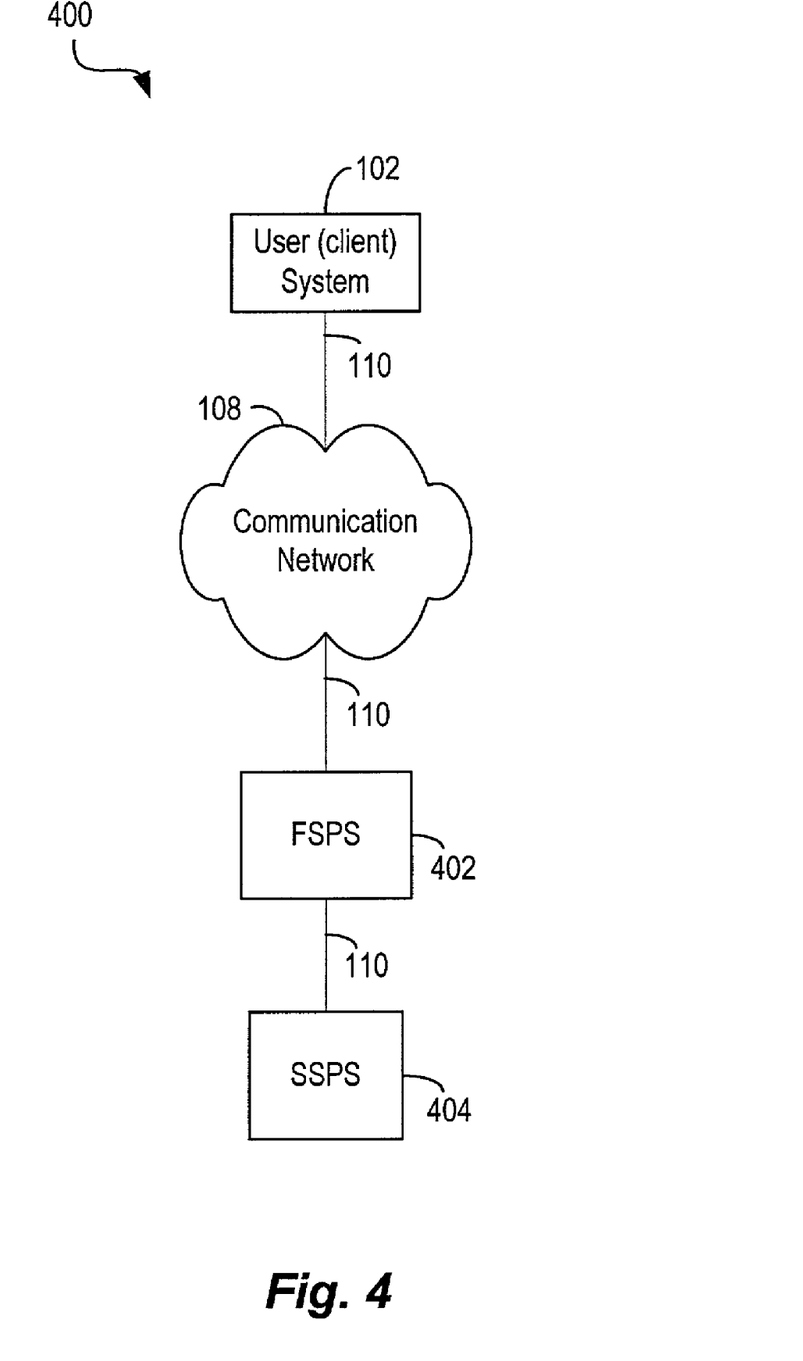
FIG. 4 is a simplified block diagram of a distributed network incorporating a specific embodiment of the present invention.

FIG. 4 is a simplified block diagram of a distributed network 400 incorporating a specific embodiment of the present invention. Like reference numerals are used in the present figure, as the other figures herein for easy referencing, but are not intended to be limiting. As depicted in FIG. 4, a user (or client) computer system 102 is coupled to a first service provider system (FSPS) 404 via a communication network 108 such as the Internet. FSPS 402 is in turn coupled to a second service provider system (SSPS) 404 via communication links 110. According to the teachings of the present invention, the communication links between FSPS 402 and SSPS 404 are secure connections. Distributed computer network 400 depicted in FIG. 4 is merely illustrative of a specific embodiment of the present invention and does not limit the scope of the invention as recited in the claims. One of ordinary skill in the art would recognize other variations, modifications, and alternatives.

User system 102, communication network 108, and communication links 110 have been described above with respect to FIG. 1. In the embodiment depicted in FIG. 4, FSPS 402 is configured to provide a service that can be used by users of user system 102. For example, FSPS 402 may store an application program (e.g. MS WORD) which can be invoked using user system 102. According to another embodiment of the present invention, FSPS 402 (or SSPS 404) may store a data object, and the service provided by FSPS 402 may include allowing user system 102 to download, make a copy, or use the data object. The data object could be a software application program, code modules, a database, a file storing information, or any other type of information or data.

The code modules providing the service (e.g. the code modules of MS WORD) may be stored on FSPS 402 or on SSPS 404. According to the teachings of the present invention, code modules and programs that contain confidential or trade secret information or which use confidential information are stored by SSPS 404. In the embodiment depicted in FIG. 4, processing related to the service may be performed by FSPS 402 or by SSPS 404. SSPS 404 is further configured to perform processing related to the use of the service. For example, SSPS is responsible for performing billing activities based upon the use of the service provided by FSPS 402 by a particular user system.

Figure 5:
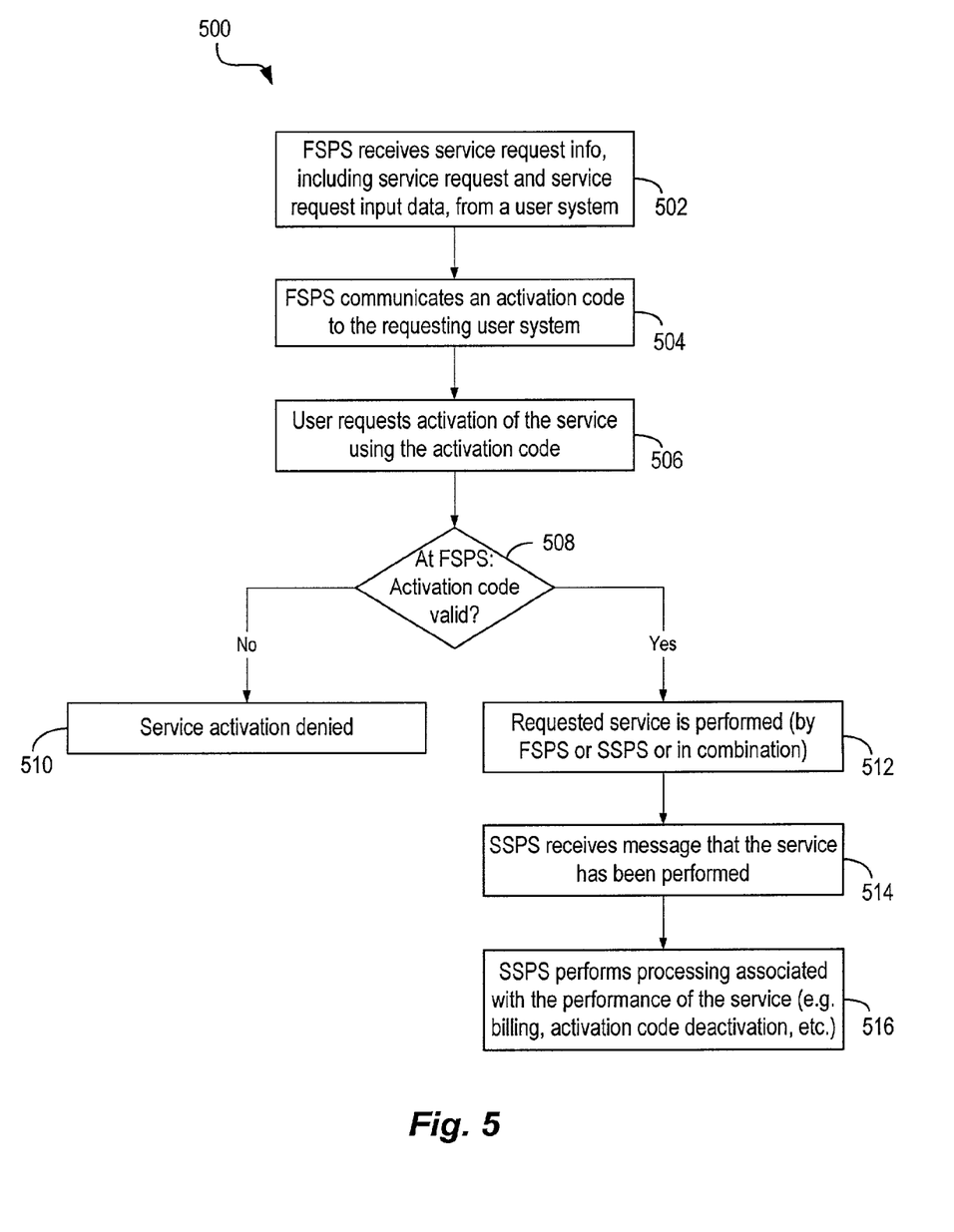
FIG. 5 is a simplified high-level flowchart depicting a method for processing service requests according to a specific embodiment of the present invention.

FIG. 5 is a simplified high-level flowchart 500 depicting a method for processing service requests according to a specific embodiment of the present invention. Flowchart 500 depicted in FIG. 5 is merely illustrative of a specific embodiment incorporating the present invention and does not limit the scope of the invention as recited in the claims. One of ordinary skill in the art would recognize other variations, modifications, and alternatives.

As depicted in FIG. 5, the method is initiated when FSPS 402 receives service request information, which may include a service request and associated service request input data, from a particular user system 102 (step 502). Processing performed by a user system to select a particular FSPS to receive the service request information has been described above.

In response to receiving the service request information, FSPS 402 communicates a service activation code back to the user system requesting the service (step 504). The activation code may be, for example, a password, an authorization key, an identification number, etc., which allows the user of the user system receiving the activation code to activate the service. The activation code may also encapsulate information about the number of times that the service can be invoked using the particular activation code, the period of time during which the service can be invoked using the particular activation code, etc.

A user using user system 102 can then use the activation code received in step 504 to request activation of the service (step 506). FSPS 402 receives the activation code from user system 102 and checks the validity of the activation code (step 508). If the activation code is determined to be invalid, the service activation request is denied (step 510). If the activation code is determined to be valid, the requested service is then performed (step 512). Examples of services include allowing the user to invoke an application program such as WORD stored by FSPS 402 or SSPS 404, allowing the user to copy or download an object stored by FSPS 402 or SSPS 404, etc. As part of step 512, results or output from the service performance may be communicated back to the user system 102 requesting the service.

The service may be performed by FSPS 402, by SSPS 404, or by FSPS 402 and SSPS 404 in combination. According to the teachings of the present invention, if the service performance involves the use of proprietary information or code modules or programs that contain trade secret material, the service is performed by SSPS 404 since code modules and information comprising trade secret or confidential information are stored by SSPS 404. If the service is to be performed by SSPS 404, then the activation code received by FSPS 402 from user system 102 is forwarded to SSPS 404 along with information identifying the service requestor. As described above with respect to communication of information between web server system 104 and service provider system 106 depicted in FIG. 3, various techniques may be used to communicate information from FSPS 402 and SSPS 404. According to an embodiment of the present invention, communication of information between FSPS 402 and SSPS 404 is performed over a secure communication channel.

After the requested service has been performed, a message or signal is communicated from FSPS 402 to SSPS 404 indicating that the service has been performed (step 514). The message may also include information indicating the identity of the user who requested the service. It should be apparent that this message need not be sent if the service is performed by SSPS 404, in which case information is already available to SSPS 404. Further, the SSPS that receives the message may be selected from a plurality of SSPSs. Techniques for selecting a particular SSPS and for communicating the message to the selected SSPS have been described above with respect to FIG. 3.

SSPS 404 then performs processing associated with the performance of the service (step 516). The processing performed by SSPS 404 may be considered as a service performed by SSPS 404 in response to performance of the service requested by the user of user system 102. According to an embodiment of the present invention, SSPS 404 is configured to perform billing activities related to the service performed in step 512. For example, SSPS 404 may generate a billing statement for the service performed. The billing statement information may indicate the compensation (e.g., fees, etc.) payable by the user of user system 102 who requested performance of the service. As part of step 516, the billing information generated by SSPS 404 may be communicated from SSPS 404 to the corresponding user system via FSPS 402. According to an alternative embodiment of the present invention, the billing related processing (step 516) may be performed by SSPS 404 before the service is performed (i.e., before step 512). In this embodiment, the service is performed contingent on the user being able to pay for the service.

As described above, the present invention enables confidential information and information containing trade secrets to be stored at SSPS 404 such that the information is not exposed to users who may access FSPS 402. For example, confidential information used for generating billing statements is stored by SSPS 404. The billing-related confidential information may include a user's credit card number, a user's bank account number, etc. In this manner, the present invention prevents unauthorized access to confidential information, and provides a secure mechanism for performing the financial billing-related operations.

As part of step 516, SSPS 404 may also perform processing to determine if the activation code for the user should be invalidated. For example, if the activation code was a "one-time use only" code, SSPS 404 may deactivate the activation code so that the user is prevented from reusing the activation code. If the user tried to reuse the same activation code, the activation code would be determined to be invalid during step 508. If the activation code was time based, i.e. allowed the service to be activated for a particular period of time, SSPS 404 may determine if the authorized time period has expired. SSPS 404 may deactivate the activation code if the time period has expired.

Various other functions may also be performed by SSPS 404. In general, any type of processing which involves the use of proprietary information or the use of code modules or programs which contain trade secret material may be stored by and executed by SSPS 404. In this manner the confidential and trade secret information is not exposed to user systems 102. The confidential information can be further protected by using secure communication channels between FSPS 402 and SSPS 404. SSPS 404 may also be protected by firewalls. As a result, vandals and hackers are prevented from gaining access to confidential or trade secret information contained in the code modules and/or the databases stored by SSPS 404. This enables the services to be performed in a secure manner.

It should be apparent that the above description describes only a specific embodiment of the present invention and does not limit the scope of the present invention as recited in the claims. Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps.

Further, while the present invention has been described using a particular combination of hardware and software, it should be recognized that other combinations of hardware and software are also within the scope of the present invention. The present invention may be implemented only in hardware or only in software or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

What is claimed is:

1. In a network environment comprising a user computer system, a plurality of web server systems, and a plurality of service provider systems, a method of performing a service, the method comprising:

at the user computer system:
configuring service request information, the service request information comprising information requesting performance of the service;
storing web server systems information identifying the plurality of web server systems coupled to the user computer system and services provided by the plurality of web server systems; and
based upon the web server systems information and the service request information, identifying a first web server system from the plurality of web server systems to receive the service request information;
communicating the service request information from the user computer system to the first web server system;

at the first web server system:
storing service provider systems information identifying the plurality of service provider systems coupled to the first web server system and services performed by the plurality of service provider systems; and
based upon the service provider systems information and the service request information, identifying a first service provider system from the plurality of service provider systems to receive the service request information;
communicating the service request information from the first web server system to the first service provider system; and
performing the service requested by the service request information at the first service provider system.

2. The method of claim 1 wherein performing the service at the first service provider system generates output data, and the method further comprises:

communicating the output data from the first service provider system to the first web server system; and communicating the output data from the first web server system to the user computer system.

3. The method of claim 1 wherein:

configuring the service request information at the user computer system comprises:

accessing a web page from a particular web server system included in the plurality of web server systems; and configuring the service request information using the web page; and identifying the first web server system from the plurality of web server systems to receive the service request information comprises:

selecting the particular web server system as the first web server system.

4. The method of claim 1 wherein identifying the first web server system from the plurality of web server systems to receive the service request information comprises:

at the user computer system:

based upon the web server systems information and the service request information, identifying a set of web server systems included in the plurality of web server systems that are configured to provide the requested service; and selecting the first web server system to receive the service request information from the set of web server systems.

5. The method of claim 4 wherein identifying a set of web server systems comprises:

polling the web server systems included in the plurality of web server systems to identify the set of web server systems that are available to provide the requested service.

6. The method of claim 1 wherein identifying the first service provider system from the plurality of service provider systems to receive the service request information comprises:

at the first web server system:

based upon the service provider systems information and the service request information, identifying a set of service provider systems included in the plurality of service provider systems that are configured to perform the requested service; and selecting the first service provider system to receive the service request information from the set of service provider systems.

7. The method of claim 6 wherein:

identifying a set of service provider systems comprises:

polling the service provider systems included in the plurality of service provider systems to identify the set of web server systems that are available to perform the requested service; and selecting the first service provider system to receive the service request information from the set of service provider systems comprises:

determining a workload for each service provider system in the set of service provider systems; and selecting a service provider system from the set of service provider systems which has the lowest workload as the first service provider system.

8. The method of claim 1 further comprising:

before identifying the first service provider system from the plurality of service provider systems to receive the service request information, determining if the service can be performed by the first web server system; and if the requested service can be performed by the first web server system, performing the service at the first web server system.

9. The method of claim 1 wherein communicating the service request information from the first web server system to the first service provider system comprises:

storing the service request information in a first location on the first web server system; and communicating a first signal from the first web server system to the first service provider system, the first signal causing the first service provider system to access the service request information from the first location.

10. The method of claim 1 wherein communicating the service request information from the first web server system to the first service provider system comprises:

communicating a message comprising the service request information from the first web server system to the first service provider system.

11. The method of claim 1 wherein communicating the service request information from the first web server system to the first service provider system comprises:

storing the service request information in a first location on the first web server system;

at the first service provider system:

periodically checking the first location on the first web server system to determine if service request information has been stored in the first location; and upon determining that the service request information has been stored in the first location, reading the service request information from the first location of the first web server system.

12. A networked system for performing a service comprising:

a user system;

a plurality of server systems coupled to the user system; and a plurality of service provider systems coupled to the plurality of server systems;

wherein the user system is configured to:

facilitate configuration of service request information, the service request information comprising information requesting performance of the service;

store web server systems information identifying the plurality of web server systems coupled to the user system and services provided by the plurality of web server systems; and based upon the web server systems information and the service request information, identify a first web server system from the plurality of web server systems to receive the service request information;

communicate the service request information from the user system to the first web server system;

wherein the first web server system is configured to:

store service provider systems information identifying the plurality of service provider systems coupled to the first web server system and services performed by the plurality of service provider systems; and based upon the service provider systems information and the service request information, identify a first service provider system from the plurality of service provider systems to receive the service request information;

communicate the service request information from the first web server system to the first service provider system; and wherein the first service provider system is configured to perform the service requested by the service request information.

13. The system of claim 12 wherein:
the first service provider system is configured to:
generate output data by performing the service; and
to communicate the output data from the first service provider system to the first web server system; and
the first web server system is configured to communicate the output data from the first web server system to the user system.

14. The system of claim 12 wherein:
the user system facilitates configuration the service request information by:
accessing a web page from a particular web server system included in the plurality of web server systems; and
allowing configuration of the service request information using the web page; and
in order to identify the first web server system from the plurality of web server systems to receive the service request information, the user system is configured to:
select the particular web server system as the first web server system.

15. The system of claim 12 wherein in order to identify the first web server system from the plurality of web server systems to receive the service request information, the user system is configured to:
based upon the web server systems information and the service request information, identify a set of web server systems included in the plurality of web server systems that are configured to provide the requested service; and
select the first web server system to receive the service request information from the set of web server systems.

16. The system of claim 15 wherein to identify a set of web server systems, the user system is configured to poll the web server systems included in the plurality of web server systems to identify the set of web server systems that are available to provide the requested service.

17. The system of claim 12 wherein to identify the first service provider system from the plurality of service provider systems to receive the service request information, the first web server system is configured to:
based upon the service provider systems information and the service request information, identify a set of service provider systems included in the plurality of service provider systems that are configured to perform the requested service; and
select the first service provider system to receive the service request information from the set of service provider systems.

18. The system of claim 17 wherein:
to identify a set of service provider systems, the first web server system is configured to poll the service provider systems included in the plurality of service provider systems to identify the set of web server systems that are available to perform the requested service; and
to select the first service provider system to receive the service request information from the set of service provider systems, the first web server system is configured to:
determine a workload for each service provider system in the set of service provider systems; and
select a service provider system from the set of service provider systems which has the lowest workload as the first service provider system.

19. The system of claim 12 wherein to communicate the service request information to the first service provider system, the first web server system is configured to:
store the service request information in a first location on the first web server system; and
communicate a first signal from the first web server system to the first service provider system, the first signal causing the first service provider system to access the service request information from the first location.

20. The system of claim 12 wherein to communicate the service request information to the first service provider system, the first web server system is configured to communicate a message comprising the service request information from the first web server system to the first service provider system.

21. The system of claim 12 wherein to communicate the service request information to the first service provider system, the first web server system is configured to store the service request information in a first location on the first web server system, and the first service provider system is configured to periodically check the first location on the first web server system to determine if service request information has been stored in the first location, and upon determining that the service request information has been stored in the first location, to read the service request information from the first location of the first web server system.

* * * * *